(12) United States Patent
Hoshikawa et al.

(10) Patent No.: US 8,461,230 B2
(45) Date of Patent: Jun. 11, 2013

(54) PROCESS FOR PRODUCING AQUEOUS POLYTETRAFLUOROETHYLENE DISPERSION FOR COAGULATION PROCESSING, AND AQUEOUS POLYTETRAFLUOROETHYLENE DISPERSION FOR COAGULATION PROCESSING

(75) Inventors: Jun Hoshikawa, Tokyo (JP); Junko Haga, Tokyo (JP); Yasuhiko Matsuoka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/370,988

(22) Filed: Feb. 10, 2012

(65) Prior Publication Data

US 2012/0157570 A1 Jun. 21, 2012

Related U.S. Application Data

(63) Continuation of application No. PCT/JP2010/068086, filed on Oct. 14, 2010.

(30) Foreign Application Priority Data

Oct. 16, 2009 (JP) .................. 2009-239354

(51) Int. Cl.
*C08C 1/08* (2006.01)
(52) U.S. Cl.
USPC .......................................... 523/335; 523/176
(58) Field of Classification Search
USPC .................................. 523/176, 335
See application file for complete search history.

(56) References Cited

U.S. PATENT DOCUMENTS

| 6,794,550 | B2 | 9/2004 | Hintzer |
| 7,141,620 | B2 | 11/2006 | Hoshikawa et al. |
| 7,514,483 | B2 | 4/2009 | Hoshikawa et al. |
| 7,514,484 | B2 | 4/2009 | Hoshikawa et al. |
| 7,671,123 | B2 | 3/2010 | Hoshikawa et al. |
| 7,709,566 | B2 | 5/2010 | Hoshikawa et al. |
| 7,834,137 | B2 | 11/2010 | Higuchi et al. |
| 2003/0125421 | A1 | 7/2003 | Bladel |
| 2005/0038177 | A1 | 2/2005 | Hoshikawa |
| 2006/0041051 | A1 | 2/2006 | Nakatani |
| 2006/0144794 | A1 | 7/2006 | Malvasi |
| 2006/0276574 | A1 | 12/2006 | Hoshikawa |
| 2008/0207859 | A1 | 8/2008 | Matsuoka |
| 2008/0287599 | A1 | 11/2008 | Dadalas |
| 2009/0272944 | A1 | 11/2009 | Poggio |
| 2010/0047585 | A1 | 2/2010 | Hintzer |

FOREIGN PATENT DOCUMENTS

| JP | 2002-532583 | 10/2002 |
| JP | 2003-268034 | 9/2003 |
| JP | 2003-531232 | 10/2003 |
| JP | 2005-8775 | 1/2005 |
| JP | 2005-501956 | 1/2005 |
| JP | 2006-188704 | 7/2006 |
| JP | 2007-16209 | 1/2007 |
| JP | 2009-533509 | 9/2009 |
| WO | 2004-050719 | 6/2004 |
| WO | 2005-007709 | 1/2005 |
| WO | 2007/049517 | 5/2007 |
| WO | 2008/076746 | 6/2008 |

OTHER PUBLICATIONS

International Search Report issued Nov. 30, 2010 in PCT/JP2010/068086 filed Oct. 14, 2010.
Satogawa Takaomi, "Fluororesin Handbook P28", published by Nikkan Kogyo Shimbun Ltd., 1990, 3 pages.

*Primary Examiner* — Edward Cain
(74) *Attorney, Agent, or Firm* — Oblon, Spivak, McClelland, Maier & Neustadt, L.L.P.

(57) ABSTRACT

This invention provide an aqueous PTFE dispersion and a process for efficiently producing the aqueous PTFE dispersion for coagulation processing having excellent coagulation properties of PTFE microparticles. The process involves adding a synthetic adsorbent, having a specific surface area of from 100 to 2,000 m²/g, to an aqueous PTFE dispersion containing both PTFE microparticles, having an average particle size of from 0.10 to 0.50 μm, and a nonionic surfactant, followed by stirring or shaking and then separation into a liquid phase and a solid phase, and recovering an aqueous PTFE dispersion which contains from 45 to 70 mass % of PTFE microparticles having an average particle size of from 0.10 to 0.50 μm and from 1.4 to 2.1 mass %, based on the mass of the PTFE microparticles, of a nonionic surfactant.

7 Claims, No Drawings

PROCESS FOR PRODUCING AQUEOUS POLYTETRAFLUOROETHYLENE DISPERSION FOR COAGULATION PROCESSING, AND AQUEOUS POLYTETRAFLUOROETHYLENE DISPERSION FOR COAGULATION PROCESSING

TECHNICAL FIELD

The present invention relates to an aqueous polytetrafluoroethylene dispersion for coagulation processing and a process for its production.

BACKGROUND ART

By polymerizing tetrafluoroethylene (hereinafter referred to also as TFE) in the presence of water, a polymerization initiator, a fluorinated anionic surfactant and a paraffin wax stabilizer, it is possible to obtain an aqueous polymerization emulsion of polytetrafluoroethylene (hereinafter referred to also as PTFE) having PTFE microparticles having an average particle size of from about 0.1 to 0.5 µm dispersed (Non-Patent Document 1). Such an aqueous polymerization emulsion of PTFE (hereinafter referred to also as an aqueous PTFE polymerization emulsion) is adjusted in the polymerization so that the concentration of the PTFE microparticles usually becomes a concentration of from 10 to 40 mass % from the viewpoint of the balance between the polymerization yield of PTFE and the polymerization stability of PTFE.

The aqueous PTFE polymerization emulsion is, as it is, likely to be agglomerated (gelled) and thus is unstable. Therefore, it is stabilized by incorporating a nonionic surfactant such as a polyoxyalkylene alkyl ether or a polyoxyethylene alkyl phenyl ether. Further, the fluorinated anionic surfactant is hardly decomposable in the natural world, and a due care is required from the viewpoint of an environmental problem. After stabilizing the aqueous PTFE polymerization emulsion by adding the nonionic surfactant, the aqueous PTFE polymerization emulsion may be passed through a resin column packed with an ion exchange resin to let the fluorinated anionic surfactant be adsorbed on the ion exchange resin thereby to reduce the content of the fluorinated anionic surfactant in the aqueous PTFE polymerization emulsion (Patent Document 1).

And, for the purpose of transportation efficiency or preventing sedimentation of PTFE microparticles, after adding the nonionic surfactant to the aqueous PTFE polymerization emulsion, concentration may be carried out by means of a known concentration method such as a phase separation method or electrophoresis to obtain a highly concentrated aqueous PTFE dispersion wherein the concentration of PTFE microparticles is about from 45 to 70 mass %.

The obtained highly concentrated aqueous PTFE dispersion is used as an aqueous PTFE dispersion, as it is, or after adding water, ammonia or other components, as the case requires (hereinafter the aqueous PTFE dispersion includes the highly concentrated aqueous PTFE dispersion).

One of usages of the aqueous PTFE dispersion is an application wherein to the aqueous PTFE dispersion, a powdery filler such as an inorganic powder, a carbonaceous powder, a metal powder, a heat resistant resin powder, an electrode material for batteries, etc., is added and mixed to coagulate PTFE microparticles, which are then processed to form a lubrication material such as a bearing, a printed board material, an electrode plate material for batteries, etc. (the aqueous PTFE dispersion suitable for such coagulation processing will hereinafter be referred to as the aqueous PTFE dispersion for coagulation processing).

In the coagulation processing, after adding the powdery filler to the aqueous PTFE dispersion for coagulation processing, the aqueous PTFE dispersion is intensely mechanically stirred, whereby PTFE microparticles are coagulated. However, in a case where the concentration of the nonionic surfactant is high in the aqueous PTFE dispersion for coagulation processing, the aqueous dispersion is too stable, whereby there is a problem such that it is difficult to coagulate PTFE microparticles simply by mechanical stirring.

To solve such a problem, a method has been proposed to use a polyvalent cationic coagulation agent such as aluminum ions, iron ions or a polymer coagulant in the coagulation processing of PTFE microparticles, or a method has been proposed to reduce the amount of the nonionic surfactant which is used at the time of stabilizing the aqueous PTFE polymerization emulsion.

PRIOR ART DOCUMENTS

Patent Document
  Patent Document 1: JP-A-2002-532583
Non-Patent Document
  Non-Patent Document 1: Fluororesin Handbook P28, complied by Satogawa Takaomi, published by Nikkan Kogyo Shimbun Ltd.

DISCLOSURE OF INVENTION

Technical Problem

However, in a case where coagulation of PTFE is promoted by using a polyvalent cationic coagulation agent such as aluminum ions, iron ions or a polymer coagulant, such a polyvalent cationic coagulation agent is likely to remain in a product, and there has been a problem such that the physical properties, durability, etc. of the final product tend to be impaired.

Further, in a case where the aqueous PTFE polymerization emulsion is stabilized by reducing the amount of the nonionic surfactant, in the subsequent step of concentrating PTFE microparticles, the concentration of the nonionic surfactant tends to be too low, whereby the concentration cannot adequately be carried out, and it is not possible to stably obtain a highly concentrated aqueous PTFE dispersion. And, if the concentration of the PTFE microparticles is low, there has been a problem that the efficiency in transportation of the product is low, or a problem such that the viscosity is low whereby PTFE microparticles are likely to settle, and the storage stability tends to be poor.

Further, if an aqueous PTFE polymerization emulsion is passed through a column packed with an anion exchange resin, as disclosed in the above Patent Document 1, the fluorinated anionic surfactant may be adsorbed on the ion exchange resin, but the nonionic surfactant will not be substantially adsorbed on the anion exchange resin, whereby the concentration of the nonionic surfactant cannot substantially be reduced. Further, in a case where an aqueous PTFE dispersion having a low concentration of a nonionic surfactant is passed through the column, PTFE microparticles are likely to agglomerate in the interior of the column, whereby the dispersion tends to be hardly passed through. And, the column is required to be frequently changed, and thus there has a problem that the productivity is thereby impaired. Especially in a case where an aqueous PTFE dispersion having a high concentration of PTFE microparticles is passed through the column, the column has tended to be clogged.

Accordingly, it is an object of the present invention to provide a process for producing an aqueous PTFE dispersion for coagulation processing, whereby it is possible to efficiently produce an aqueous PTFE dispersion for coagulation processing which is excellent in coagulation properties of PTFE microparticles, and to provide such an aqueous PTFE dispersion for coagulation processing.

Solution To Problem

The present invention provides the following.

[1] A process for producing an aqueous PTFE dispersion for coagulation processing, which comprises adding a synthetic adsorbent having a specific surface area of from 100 to 2,000 m²/g, to an aqueous PTFE dispersion containing from 45 to 70 mass % of PTFE microparticles having an average particle size of from 0.10 to 0.50 µm and from 2.2 to 6 mass %, based on the mass of the PTFE microparticles, of a nonionic surfactant, in a proportion of from 0.5 to 15 mass %, based on the mass of the PTFE microparticles, followed by stirring or shaking and then by separation into a liquid phase and a solid phase, and recovering the liquid phase.

[2] The process for producing an aqueous PTFE dispersion for coagulation processing according to [1], wherein after adding the synthetic adsorbent to the aqueous PTFE dispersion, the stirring or shaking is carried out for from 1 to 100 hours, and then the separation is carried out, to bring the concentration of the nonionic surfactant to be from 1.4 to 2.1 mass %, based on the mass of the PTFE microparticles.

[3] The process for producing an aqueous PTFE dispersion for coagulation processing according to [1] or [2], wherein the separation is carried out by subjecting the aqueous PTFE dispersion containing the synthetic adsorbent to filtration with a filter of from 50 to 500 mesh.

[4] The process for producing an aqueous PTFE dispersion for coagulation processing according to any one of [1] to [3], wherein the nonionic surfactant is represented by the following formula (1) and/or formula (2):

$$R^1\text{—O—A—H} \quad (1)$$

(in the formula (1), $R^1$ is a $C_{8-18}$ alkyl group, and A is a polyoxyalkylene chain composed of from 5 to 20 oxyethylene groups, from 0 to 2 oxypropylene groups and from 0 to 2 oxybutylene groups),

$$R^2\text{—}C_6H_4\text{—O—B—H} \quad (2)$$

(in the formula (2), $R^2$ is a $C_{4-12}$ alkyl group, and B is a polyoxyethylene chain composed of from 5 to 20 oxyethylene groups).

[5] The process for producing an aqueous PTFE dispersion for coagulation processing according to any one of [1] to [4], wherein the nonionic surfactant is added to an aqueous polymerization emulsion of a PTFE obtained by subjecting TFE to emulsion polymerization in the presence of water, a polymerization initiator and a fluorinated anionic surfactant, followed by contact with an anion exchange resin to reduce the fluorinated anionic surfactant in the aqueous polymerization emulsion, and then, concentration treatment is carried out to obtain the aqueous PTFE dispersion.

[6] The process for producing an aqueous PTFE dispersion for coagulation processing according to [5], wherein the aqueous polymerization emulsion of a PTFE is contacted with the anion exchange resin to bring the content of the fluorinated anionic surfactant in the aqueous polymerization emulsion of a PTFE to be from 0.00001 to 1 mass %, based on the mass of the PTFE microparticles.

[7] The process for producing an aqueous PTFE dispersion for coagulation processing according to [5] or [6], wherein the fluorinated anionic surfactant is $C_2F_5OC_2F_4OCF_2COONH_4$.

[8] An aqueous PTFE dispersion for coagulation processing obtained by the process as defined in any one of [1] to [7], which contains from 45 to 70 mass % of PTFE microparticles having an average particle size of from 0.10 to 0.50 µm and from 1.4 to 2.1 mass %, based on the mass of the PTFE microparticles, of a nonionic surfactant.

[9] The aqueous PTFE dispersion for coagulation processing according to [8], wherein the content of the fluorinated anionic surfactant in the aqueous PTFE dispersion for coagulation processing is from 0.00001 to 1 mass %, based on the mass of the PTFE microparticles.

Advantageous Effects of Invention

According to the present invention, a synthetic adsorbent having a specific surface area of from 100 to 2,000 m²/g is added to an aqueous PTFE dispersion containing from 45 to 70 mass % of PTFE microparticles having an average particle size of from 0.10 to 0.50 µm and from 2.2 to 6 mass %, based on the mass of the PTFE microparticles, of a nonionic surfactant, in a proportion of from 0.5 to 15 mass %, based on the mass of the PTFE microparticles, followed by stirring or shaking, whereby the nonionic surfactant contained in the aqueous PTFE dispersion is adsorbed on the synthetic adsorbent. And, by carrying out separation into a liquid phase and a solid phase and recovering the liquid phase, at least a part of the nonionic surfactant contained in the aqueous PTFE dispersion is separated and removed together with the synthetic adsorbent, whereby the concentration of the nonionic surfactant in the liquid phase can be reduced, and it is possible to efficiently produce an aqueous PTFE dispersion for coagulation processing which is excellent in coagulation processing properties of PTFE microparticles.

Further, the aqueous PTFE dispersion for coagulation processing to be produced by the process of the present invention has a high concentration of PTFE microparticles, whereby PTFE microparticles are less susceptible to sedimentation separation and excellent in storage stability, and further, the concentration of the nonionic surfactant is reduced, whereby PTFE microparticles can efficiently be coagulated in a shorter time. Therefore, the dispersion is excellent in handling efficiency.

DESCRIPTION OF EMBODIMENTS

The aqueous PTFE dispersion to be used in the present invention contains from 45 to 70 mass % of PTFE microparticles having an average particle size of from 0.10 to 0.50 µm and from 2.2 to 6 mass %, based on the mass of the PTFE microparticles, of a nonionic surfactant. In the present invention, PTFE is meant for, in addition to TFE homopolymer, so-called modified PTFE i.e. PTFE containing polymerized units derived from a copolymer component copolymerizable with TFE, such as a halogenated ethylene such as chlorotrifluoroethylene, a halogenated propylene such as hexafluoropropylene or a fluorovinyl ether such as a perfluoro(alkyl vinyl ether) in such a very small amount as not substantially melt processable.

The average particle size of the PTFE microparticles contained in the aqueous PTFE dispersion is from 0.10 to 0.50 µm, preferably from 0.12 to 0.40 µm, particularly preferably from 0.15 to 0.30 µm. If the average particle size of the PTFE microparticles is less than 0.10 µm, the mechanical properties as PTFE tend to be impaired. On the other hand, if the average particle size of the PTFE microparticles exceeds 0.50 μm, the PTFE microparticles are likely to be sedimented, whereby the storage stability tends to be impaired. In the present invention, the average particle size of the PTFE microparticles means a value obtained in such a manner that the aqueous PTFE polymerization emulsion is dried, whereupon by means of a scanning electron microscope, photographing is carried out with 10,000 magnifications, and from the photographed image, 100 PTFE microparticles are randomly selected, and the long and short diameters of the respective PTFE microparticles are measured, and their average value is taken as the average particle size.

The number average molecular weight of PTFE in the present invention may optionally be selected. It is preferably from 100,000 to 30,000,000, more preferably from 200,000 to 25,000,000, particularly preferably from 300,000 to 20,000,000. If the number average molecular weight of PTFE is less than 100,000, the mechanical properties as PTFE tend to deteriorate. On the other hand, if the number average molecular weight of PTFE exceeds 30,000,000, the industrial production tends to be difficult.

The concentration of PTFE microparticles in the aqueous PTFE dispersion is from 45 to 70 mass %, preferably from 50 to 68 mass %, particularly preferably from 54 to 67 mass %. If the concentration of PTFE microparticles is less than 45 mass %, the PTFE microparticles are likely to be sedimented, whereby the storage stability tends to be inadequate. On the other hand, if the concentration of PTFE microparticles exceeds 70 mass %, the yield tends to be low at a time of concentration to increase the concentration of the PTFE microparticles.

The nonionic surfactant contained in the aqueous PTFE dispersion is not particularly limited, and may be a known surfactant. For example, one represented by the following formula (1) and/or (2) may suitably be used. As the nonionic surfactant of the formula (1) or (2), one type may be used alone, or two or more types may be used as mixed.

$$R^1\text{—O—A—H} \tag{1}$$

(in the formula (1), $R^1$ is a $C_{8-18}$ alkyl group, and A is a polyoxyalkylene chain composed of from 5 to 20 oxyethylene groups, from 0 to 2 oxypropylene groups and from 0 to 2 oxybutylene groups.)

$$R^2\text{—}C_6H_4\text{—O—B—H} \tag{2}$$

(in the formula (2), $R^2$ is a $C_{4-12}$ alkyl group, and B is a polyoxyethylene chain composed of from 5 to 20 oxyethylene groups.)

In the formula (1), the alkyl group for $R^1$ has a number of carbon atoms being from 8 to 18, preferably from 10 to 16, particularly preferably from 12 to 16. If the number of carbon atoms of the alkyl group for $R^1$ is larger than this range, the flow temperature of the nonionic surfactant tends to be high, whereby the handling tends to be difficult. Further, when the aqueous PTFE dispersion for coagulation processing is left to stand for a long period of time, PTFE microparticles are likely to be sedimented, and the storage stability tends to be impaired. On the other hand, if the number of carbon atoms of the alkyl group for $R^1$ is smaller than this range, the surface tension of the aqueous PTFE dispersion for coagulation processing tends to be high, and the miscibility with a powdery filler tends to deteriorate.

In the formula (1), A being a hydrophilic group, is a polyoxyalkylene chain composed of from 5 to 20 oxyethylene groups, from 0 to 2 oxypropylene groups and from 0 to 2 oxybutylene groups, and it is preferably a polyoxyalkylene chain composed of from 7 to 12 oxyethylene groups and from 0 to 2 oxypropylene groups, from the viewpoint of the viscosity and stability. It is particularly preferred that the hydrophilic group A contains from 0.5 to 1.5 oxypropylene groups, whereby an antifoaming property is good.

In the formula (2), the alkyl group for $R^2$ has a number of carbon atoms being 4 to 12, preferably from 6 to 10, particularly preferably from 8 to 9. If the number of carbon atoms of the alkyl group for $R^2$ is larger than this range, PTFE microparticles are likely to be sedimented when left to stand for a long period of time, and the storage stability tends to be impaired. On the other hand, if the number of carbon atoms of the alkyl group for $R^2$ is smaller than this range, the surface tension of the aqueous PTFE dispersion for coagulation processing tends to be high, and the miscibility with a powdery filler tends to deteriorate.

In the formula (2), B being a hydrophilic group, is a polyoxyethylene chain composed of from 5 to 20 oxyethylene groups, and the number of oxyethylene groups is preferably from 6 to 16, particularly preferably from 7 to 12, from the viewpoint of the viscosity and stability.

Specific examples of the nonionic surfactant of the formula (1) include, for example, $C_{13}H_{27}O\text{—}(C_2H_4O)_{10}H$, $C_{12}H_{25}O\text{—}(C_2H_4O)_{10}H$, $C_{10}H_{21}CH(CH_3)CH_2O\text{—}(C_2H_4O)_9H$, $C_{13}H_{27}O\text{—}(C_2H_4O)_8\text{—}CH(CH_3)CH_2OH$, $C_{13}H_{27}O\text{—}CH_2CH(C_2H_5)O\text{—}(C_2H_4O)_8H$, $C_{16}H_{33}O\text{—}(C_2H_4O)_{10}H$, $HC(C_5H_{11})(C_7H_{15})O\text{—}(C_2H_4O)_9H$, etc. Further, as commercial products, Tergitol (registered trademark) 15S series, manufactured by The Dow Chemical Company, Newcol (registered trademark) series, manufactured by Nippon Nyukazai Co., Ltd., Lionol (registered trademark) TD series, manufactured by Lion Corporation, etc. may be mentioned.

Specific examples of the nonionic surfactant of the formula (2) include, for example, $C_8H_{17}\text{—}C_6H_4O\text{—}(C_2H_4O)_{10}H$, $C_9H_{19}\text{—}C_6H_4O\text{—}(C_2H_4O)_{10}H$, etc. Further, as commercial products, Triton (registered trademark) X series, manufactured by The Dow Chemical Company, Nikkol (registered trademark) OP series, manufactured by Nikko Chemicals Co., Ltd., etc. may be mentioned.

Here, a commercial nonionic surfactant is a mixture of a plurality of substances having different molecular structures, and therefore, the number of carbon atoms of the alkyl group and the numbers of oxyethylene groups and oxypropylene groups in the polyoxyalkylene chain in the nonionic surfactant, are represented by average values. Therefore, the respective numerical values are not limited to integers.

The content of the nonionic surfactant in the aqueous PTFE dispersion is from 2.2 to 6 mass %, preferably from 2.2 to 5 mass %, more preferably from 2.2 to 4 mass %, based on the mass of the PTFE microparticles. If the content of the nonionic surfactant is less than 2.2 mass % based on the mass of the PTFE microparticles, it is not possible to increase the concentration of PTFE microparticles in the aqueous PTFE dispersion. As a result, sedimentation of the PTFE microparticles is accelerated, whereby the storage stability will be impaired. On the other hand, if the content of the nonionic surfactant exceeds 6 mass % based on the mass of the PTFE microparticles, a large amount of the synthetic adsorbent will be required to remove the nonionic surfactant, such being not economical.

The content of the fluorinated anionic surfactant in the aqueous PTFE dispersion is preferably from 0.00001 to 1 mass %, more preferably from 0.0005 to 0.01 mass %, based on the mass of the PTFE microparticles. If the content of the fluorinated anionic surfactant is less than 0.00001 mass % based on the mass of the PTFE microparticles, the aqueous PTFE dispersion for coagulation processing tends to be unstable. On the other hand, if the content of the fluorinated anionic surfactant is larger than 1 mass % based on the mass of the PTFE microparticles, such may be undesirable from the viewpoint of the influence to the environment.

The aqueous PTFE dispersion to be used in the present invention can be produced via an emulsion polymerization step of emulsion polymerizing TFE in the presence of water, a polymerization initiator and a fluorinated anionic surfactant to obtain an aqueous PTFE polymerization emulsion, a stabilizing step of stabilizing the aqueous PTFE polymerization emulsion obtained in the emulsion polymerization step by adding a nonionic surfactant thereto, a fluorinated anionic surfactant-reducing step of contacting the aqueous PTFE polymerization emulsion after the stabilizing step with an anion exchange resin to reduce the fluorinated anionic surfactant in the aqueous PTFE polymerization emulsion, and a concentrating step of subjecting the aqueous PTFE polymerization emulsion after the fluorinated anionic surfactant-reducing step to concentration treatment. Now, each step will be described in detail.

In the emulsion polymerization step, TFE is emulsion-polymerized in the presence of water, a polymerization initiator and a fluorinated anionic surfactant to produce an aqueous PTFE polymerization emulsion containing PTFE microparticles having an average particle size of from 0.10 to 0.50 μm.

As the emulsion polymerization, emulsion polymerization is preferred wherein TFE is injected under a pressure of from 2 to 50 atm in the presence of water, a polymerization initiator, a fluorinated anionic surfactant and a paraffin wax stabilizer.

Further, it is preferred to carry out the emulsion polymerization so that the concentration of PTFE microparticles in the obtainable aqueous PTFE polymerization emulsion will be from 10 to 40 mass %, more preferably from 15 to 37 mass %, particularly preferably from 20 to 35 mass %. If the concentration of PTFE microparticles is less than 10 mass %, the production efficiency tends to be low, and if it exceeds 40 mass %, PTFE microparticles are likely to agglomerate during the polymerization step, thus leading to a problem of forming a gelled substance.

The polymerization initiator to be used for the emulsion polymerization step is not particularly limited, and a known initiator may be used. For example, a persulfate such as ammonium persulfate or potassium persulfate, a water-soluble organic peroxide such as disuccinic acid peroxide, diglutaric acid peroxide or tert-butyl hydroperoxide, or a redox polymerization initiator by a combination of a chlorate, a bromate or a permanganate with a reducing agent may, for example, be preferably used.

As the fluorinated anionic surfactant to be used for the emulsion polymerization step, one represented by the following formula (3) may, for example, be preferably used.

$$R^3\text{—COOX} \quad (3)$$

(in the formula (3), $R^3$ is a $C_{5-9}$ alkyl group wherein from 90 to 100% of hydrogen atoms are substituted by fluorine atoms (provided that the alkyl group may contain from 1 to 2 etheric oxygen atoms), and X is an ammonium ion.)

Specific examples of the fluorinated anionic surfactant of the formula (3) include, for example, $C_2F_5OCF_2CF_2OCF_2COONH_4$ (hereinafter referred to as EEA), $C_7F_{15}COONH_4$ (hereinafter referred to as APFO), $HC_7F_{14}COONH_4$, $C_6F_{13}COONH_4$, $HC_6F_{12}COONH_4$, $C_8F_{17}COONH_4$, $C_4F_9OC_2F_4COONH_4$, etc. EEA or APFO is preferred, since the polymerization process is thereby stable. Particularly preferred is EEA, since when ingested by a small animal, accumulation in body is small.

The fluorinated anionic surfactant is preferably used so that it will be from 0.05 to 1.0 mass %, more preferably from 0.1 to 0.8 mass %, particularly preferably from 0.15 to 0.6 mass %, based on the mass of the finally obtainable PTFE microparticles. If the amount of the fluorinated anionic surfactant to be used is less than the above range, PTFE microparticles are likely to be agglomerated in the obtained aqueous PTFE polymerization emulsion, whereby the yield may decrease. On the other hand, if the amount of the fluorinated anionic surfactant to be used is larger than the above range, PTFE tends to be hardly obtainable as microparticles.

As the paraffin wax stabilizer to be used in the emulsion polymerization step, purified wax having a melting point of from 30 to 99° C. is preferred, one having a melting point of from 40 to 80° C. is further preferred, and one having a melting point of from 45 to 70° C. is particularly preferred.

In the stabilizing step, the aqueous PTFE polymerization emulsion obtained in the emulsion polymerization step is stabilized by adding a nonionic surfactant thereto.

The nonionic surfactant to be used in the stabilizing step is not particularly limited, and the above-mentioned one may be used. And its amount is preferably from 2.2 to 20 mass %, more preferably from 2.2 to 18 mass %, particularly preferably from 2.2 to 15 mass %, based on the mass of PTFE microparticles. If the amount of the nonionic surfactant to be used is smaller than the above range, PTFE microparticles are likely to be agglomerated in the aqueous PTFE polymerization emulsion in the subsequent step whereby the yield may be low. On the other hand, if the amount of the nonionic surfactant to be added is larger than the above range, the amount of the synthetic adsorbent to be used at the time of reducing the nonionic surfactant tends to be large, such being not economical.

In the fluorinated anionic surfactant-reducing step, the aqueous PTFE polymerization emulsion after the stabilizing step is contacted with an anion exchange resin to reduce the fluorinated anionic surfactant in the aqueous PTFE polymerization emulsion. The fluorinated anionic surfactant is reduced preferably so that it becomes from 0.00001 to 1 mass %, more preferably from 0.0001 to 0.1 mass %, particularly preferably from 0.0005 to 0.01 mass %, based on the mass of PTFE microparticles. If the content of the fluorinated anionic surfactant is less than 0.00001 mass %, PTFE microparticles are likely to be agglomerated and unstable, and if it exceeds 1 mass %, such being undesirable when the influence to the environment is taken into account.

The anion exchange resin to be used in the fluorinated anionic surfactant-reducing step is not particularly limited, and a known anion exchange resin may be used, but one wherein the counter ion is OH type is preferred. For example, a commercially available one such as Diaion (registered trademark) WA-30, manufactured by Mitsubishi Chemical Corporation, Lewatit (registered trademark) MP-62WS, manufactured by Lanxess, or Dowex Marathon (registered trademark) WBA, manufactured by The Dow Chemical Company may, for example, be used. Otherwise, a Cl type anion exchange resin such as Lewatit (registered trademark) MP-600WS, manufactured by Lanxess may be used as converting it to OH type by an aqueous sodium hydroxide solution.

The method for contacting the aqueous PTFE polymerization emulsion with the anion exchange resin is not particularly limited, and a known method may be employed. For example, it may be a method of passing the aqueous PTFE polymerization emulsion through a column packed with the anion exchange resin, or a method of adding the anion exchange resin in the aqueous PTFE polymerization emulsion, followed by stirring or shaking.

In the fluorinated anionic surfactant-reducing step, in order to improve the stability after reducing the fluorinated anionic surfactant, a hydrocarbon type anionic surfactant may be added in an amount of from 0.01 to 0.3 mass %, preferably from 0.02 to 0.25 mass %, based on the mass of the PTFE microparticles. The hydrocarbon type anionic surfactant may, for example, be ammonium laurate, ethanolamine laurate, ammonium cinnamate, ammonium lauryl sulfate, sodium lauryl sulfate, triethanolamine lauryl sulfate or ammonium p-t-butyl benzoate.

In the concentration step, the aqueous PTFE polymerization emulsion having the fluorinated anionic surfactant reduced, is subjected to concentration treatment to increase the concentration of PTFE microparticles thereby to obtain an aqueous PTFE dispersion.

The method for concentrating the aqueous PTFE polymerization emulsion is not particularly limited, and a known method may be employed. For example, a phase separation method or an electrophoresis may be mentioned.

The phase separation method is a method wherein a nonionic surfactant is dissolved in the aqueous PTFE polymerization emulsion, and an electrolyte such as ammonia is added, followed by being held at a temperature of from 50 to 99° C. for at least a few hours for phase separation into a sedimented liquid at a lower portion containing a large amount of PTFE microparticles and a supernatant at the upper portion containing substantially no PTFE microparticles, whereupon the supernatant is removed to obtain a highly concentrated aqueous PTFE dispersion.

Whereas, the electrophoresis is a method wherein a nonionic surfactant is dissolved in the aqueous PTFE polymerization emulsion, and a voltage is applied between the positive and negative electrodes via a plurality of vertically disposed semipermeable membranes to have PTFE microparticles migrated towards the positive electrode side and concentrated at the semipermeable membrane surface to have a high specific viscosity and sedimented at a lower portion, whereupon the highly concentrated aqueous PTFE dispersion is collected.

Other than these methods, a method for concentration by evaporating water for drying, a method for concentration by removing water by means of a reverse osmosis membrane, etc. may, for example, be used.

The synthetic adsorbent to be used in the present invention is synthetic resin particles having a porous insoluble three dimensional crosslinked structure. The specific surface area of the synthetic adsorbent is from 100 to 2,000 $m^2/g$, preferably from 200 to 1,800 $m^2/g$, more preferably from 400 to 1,500 $m^2/g$. If the specific surface area of the synthetic adsorbent is less than 100 $m^2/g$, the efficiency for removal of the nonionic surfactant in the aqueous PTFE dispersion tends to be low, and if it exceeds 2,000 $m^2/g$, the speed for removal of the nonionic surfactant tends to be low, or PTFE microparticles are likely to be agglomerated in the step for removal of the nonionic surfactant. Here, the specific surface area of the synthetic adsorbent in the present invention means a value measured by a BET method.

The average particle size of the synthetic adsorbent is preferably from 0.1 to 2.0 mm, more preferably from 0.2 to 1.5 mm, particularly preferably from 0.3 to 1.0 mm. If the average particle size of the synthetic adsorbent is less than 0.1 mm, it tends to be difficult to separate it after contacting it with the aqueous PTFE dispersion, and if it exceeds 2.0 mm, it takes time for adsorption of the nonionic surfactant, whereby the efficiency tends to be low. Here, the average particle size of the synthetic adsorbent in the present invention means a 50% mass value obtainable by plotting the integral mass after being classified by sieving in a graph.

The pore volume of the synthetic adsorbent is preferably from 0.1 to 2 ml/g, more preferably from 0.3 to 1.5 ml/g, particularly preferably from 0.5 to 1.3 ml/g. If the pore volume of the synthetic adsorbent is less than 0.1 ml/g, the adsorption of the nonionic surfactant tends to be low, and if it exceeds 2 ml/g, the strength tends to deteriorate. Here, the pore volume of the synthetic adsorbent in the present invention means a value measured by a nitrogen method.

The synthetic adsorbent should better contain water, whereby adsorption of the nonionic surfactant is facilitated, and the adsorption will be stabilized. The amount of water is preferably from 20 to 80 mass %, more preferably from 30 to 70 mass %, particularly preferably from 40 to 60 mass %. If the amount of water in the synthetic adsorbent is less than 20 mass %, the adsorption of the nonionic surfactant tends to be low, and if it exceeds 80 mass %, weighing may sometimes be unstable.

An example of the synthetic adsorbent to be used in the present invention may be a single monomer or a plurality of monomers of e.g. styrene, divinylbenzene and a methacrylic acid ester, or beads-form particles having a large specific surface area obtainable by mixing an alkane or the like with a non-reactive solvent, followed by polymerization and crosslinking reaction of the monomer. Further, as a commercial product, Diaion (registered trademark) HP-20 (specific surface area: 511 $m^2/g$), SP-800 (specific surface area: 819 $m^2/g$), SP-205 (specific surface area: 507 $m^2/g$) or HP1 MG (specific surface area: 333 $m^2/g$), manufactured by Mitsubishi Chemical Corporation, Lewatit (registered trademark) VPOC1163 (specific surface area: 1,200 $m^2/g$), manufactured by Lanxess, Hypersol-Macronet (registered trademark) MN202 (specific surface area: 700 $m^2/g$) or MN270 (specific surface area: 1,400 $m^2/g$), manufactured by Purolite, or Amberlite (registered trademark) XAD4 (specific surface area: 750 $m^2/g$) or XAD7HP (specific surface area: 400 $m^2/g$), manufactured by Rohm and Haas Company, may, for example, be mentioned.

Now, the process for producing an aqueous PTFE dispersion for coagulation processing of the present invention will be described.

In the present invention, firstly, a synthetic adsorbent is added to the above aqueous PTFE dispersion in a proportion of from 0.5 to 15 mass % based on the mass of the PTFE microparticles in the aqueous PTFE dispersion. Preferably, it is added in a proportion of from 1 to 13 mass %, particularly preferably in a proportion of from 1.2 to 10 mass %. If the amount of the synthetic adsorbent to be added is less than 0.5 mass %, the effect to reduce the nonionic surfactant tends to be small, and if it exceeds 15 mass %, the concentration of the nonionic surfactant is likely to be too low, whereby agglomeration (gelation) may take place.

Further, the amount of the synthetic adsorbent to be added is preferably from 1 to 30 times by mass, more preferably from 1.5 to 20 times by mass, particularly preferably from 2 to 12 times by mass, to the mass of the nonionic surfactant to be reduced. If the amount of the synthetic adsorbent to be added is less than 1 time by mass to the mass of the nonionic surfactant to be reduced, the effect to reduce the nonionic surfactant tends to be small, and if it exceeds 20 times by mass, the concentration of the nonionic surfactant is likely to be too low, whereby PTFE microparticles may be agglomerated.

Then, the aqueous PTFE dispersion having the synthetic adsorbent added, is stirred or shaken. If the synthetic adsorbent is added in a non-uniform state, the nonionic surfactant may be locally adsorbed too much, whereby PTFE microparticles may be agglomerated. By the stirring or shaking after the addition of the synthetic adsorbent, the adsorbent is mixed uniformly, and the nonionic surfactant contained in the aqueous PTFE dispersion will be uniformly adsorbed, whereby it is possible to prevent a problem of agglomeration of PTFE microparticles. In a case where the aqueous PTFE dispersion is passed through a column packed with the synthetic adsorbent to have the nonionic surfactant adsorbed on the synthetic adsorbent, PTFE microparticles are likely to be agglomerated in the column during the passing through the column to clog the column, whereby it is difficult to carry out passing through stably. Especially when the concentration of PTFE microparticles in the aqueous PTFE dispersion is high, or the concentration of the nonionic surfactant is low, the column is likely to be clogged.

The treating time for stirring or shaking is preferably from 1 to 100 hours. The treating time is preferably from 2 to 50 hours, more preferably from 4 to 30 hours. If the treating time is less than 1 hour, the effect to reduce the nonionic surfactant tends to be small, and if it exceeds 100 hours, PTFE microparticles are likely to be agglomerated by the excessive stirring.

The stirring method may be a method wherein stirring vanes are inserted, and stirring is carried out by rotating the stirring vanes. The stirring speed varies depending upon the size and shape of the container, but it is preferably such a speed that the synthetic adsorbent is dispersed in the liquid and the entire liquid flows slowly. Specifically, the forward end peripheral speed of the stirring vanes is preferably from 0.01 to 2 m/sec, more preferably from 0.05 to 1 m/sec, particularly preferably from 0.1 to 0.5 m/sec.

The shaking method may be a method wherein the shielded entire container is inverted at 180° or 360° to stir the liquid, or a method wherein the entire container is shaken in such cycles that the liquid in the interior of the container is swirled.

In the present invention, stirring or shaking is carried out to have the nonionic surfactant contained in the aqueous PTFE dispersion adsorbed on the synthetic adsorbent, whereupon the liquid phase and the solid phase are separated, and the liquid phase is recovered.

Here, the liquid phase is a phase of the aqueous PTFE dispersion containing PTFE microparticles, and the solid phase is a phase of the synthetic adsorbent. By the separation of the liquid phase and the solid phase, at least a part of the nonionic surfactant contained in the aqueous PTFE dispersion is separated and removed together with the synthetic adsorbent, whereby the concentration of the nonionic surfactant in the aqueous PTFE dispersion can be reduced.

In the present invention, as the method for separating the liquid phase, a method of filtration by means of a filter of from 50 to 500 mesh is preferably employed. The filter to be used for the filtration is more preferably from 60 to 300 mesh, particularly preferably from 70 to 200 mesh. If the size of the filter is less than 50 mesh, separation may sometimes be inadequate, and if it exceeds 500 mesh, the permeation speed of the aqueous PTFE dispersion tends to be low, and it takes time for separation.

The aqueous PTFE dispersion for coagulation processing of the present invention thus obtainable, contains PTFE microparticles having an average particle size of from 0.10 to 0.50 μm in an amount of from 45 to 70 mass %, preferably from 50 to 68 mass %, particularly preferably from 54 to 67 mass %.

Further, the content of the nonionic surfactant is from 1.4 to 2.1 mass %, preferably from 1.5 to 2.0 mass %, particularly preferably from 1.6 to 1.9 mass %, based on the mass of the PTFE microparticles. If the content of the nonionic surfactant is less than 1.4 mass %, the aqueous PTFE dispersion tends to be unstable as a dispersion, and if it exceeds 2.1 mass %, coagulation processing may sometimes be impossible. Here, in order to further reduce the content of the nonionic surfactant, in the above-described production process, the amount of the synthetic adsorbent to be added to the aqueous PTFE dispersion may be increased, a synthetic adsorbent having a large specific surface area may be used, or the stirring or shaking time after adding the synthetic adsorbent to the aqueous PTFE dispersion may be prolonged.

Further, the content of the fluorinated anionic surfactant is preferably from 0.00001 to 1 mass %, more preferably from 0.0005 to 0.01 mass %, based on the mass of the PTFE microparticles. If the content of the fluorinated anionic surfactant is less than 0.00001 mass % based on the mass of the PTFE microparticles, the aqueous PTFE dispersion tends to be unstable as a dispersion, and if it exceeds 1 mass %, such may be undesirable from the viewpoint of the adverse effect to the environment.

To the aqueous PTFE dispersion for coagulation processing of the present invention, water, ammonia, a very small amount of an antiseptic or other known components may be added, as the case requires.

As it is, or after diluting with water, the aqueous PTFE dispersion for coagulation processing of the present invention may be coagulated by adding a desired powdery filler, followed by intense mechanical stirring and then may be used for applications as an electrode material for batteries, a lubricating component, etc. Further, at the time of its use, known components such as an organic solvent, a very small amount of a coagulating agent, a colorant, etc., may be added. As examples of the powdery filler, for example, in a case where it is utilized as a lubricating component, an inorganic powder such as a lead powder, a zinc powder, a glass powder, a glass fiber powder, a quartz powder or an alumina powder, a carbonaceous powder such as a graphite powder, a coke powder or a carbon fiber powder, a metal powder such as a bronze powder, a copper powder or a stainless steel powder, and a heat resistant resin powder such as a polyamide powder, a polyimide powder, a polyether ketone powder, a polyether ether ketone powder or a polyether sulfone powder, may, for example, be mentioned. Further, in a case where it is used as an electrode material for batteries, a manganese dioxide powder, a zinc powder, a graphite powder, a nickel oxyhydroxide powder, a lithium manganate powder, a lithium cobaltate powder and a hydrogen storage alloy powder may, for example, be mentioned.

EXAMPLES

Now, the present invention will be described in further detail with reference to Examples and Comparative Examples, but it should be understood that the present invention is by no means thereby restricted.

Examples of the present invention are the following Examples 1 to 5, and their results are shown in Table 1. Further, Comparative Examples are the following Examples 6 to 11, and the results of Examples 6 to 10 are shown in Table 2. Further, the type of the nonionic surfactant used in each Example is shown in Table 3, and the type of the adsorbent used in each Example is shown in Table 4.

[Evaluation Methods]

(A) Number average molecular weight of PTFE: In accordance with the method by Suwa (Journal of Applied Polymer Science, 17, 3253 (1973)), the number average molecular weight M was obtained by the following formula from the latent heat ΔHc (cal/g) obtained by a differential thermal analysis.

$$M = 2.1 \times 10^{10} \times \Delta Hc^{-5.16}$$

(B) Average particle size of PTFE microparticles: After drying the aqueous PTFE polymerization emulsion, photographing was carried out with 10,000 magnifications by means of a scanning electron microscope, and from the photographed image, 100 PTFE microparticles were randomly selected, and the long and short diameters of the respective PTFE microparticles were measured, and the average particle size was obtained from their average value.

(C) Concentration of PTFE microparticles, concentration of surfactant: In an aluminum dish (mass: $W_0$), about 10 g of an aqueous PTFE dispersion was put and weighed (mass: $W_1$), and the concentrations were obtained from the following formulae from the mass after drying at 120° C. for one hour (mass: $W_2$) and the mass after drying at 380° C. for 35 minutes (mass: $W_3$).

Concentration of PTFE microparticles (mass %)=
[($W_3-W_0$)/($W_1-W_0$)]×100

Concentration of nonionic surfactant (mass %/PTFE)=
[($W_2-W_3$)/($W_3-W_0$)]×100

(D) Concentration of fluorinated anionic surfactant: By means of GC-MS (mass analyzer-equipped gas chromatography), a calibration curve was preliminarily prepared from peak areas of fragments obtained by using a fluorinated anionic surfactant with known concentrations. Then, after naturally drying 10 g of a sample liquid, the fluorinated anionic surfactant was extracted with ethanol, and the peak area was measured by GC-MS, whereupon by using the calibration curve, the fluorinated anionic surfactant in the sample liquid was obtained.

(E) pH: Obtained by a glass electrode method.

(F) Viscosity: Using a Brookfield viscometer, the viscosity was measured at 60 rpm by means of No. 1 spindle.

(I) Coagulation test: Using 500 of an aqueous PTFE dispersion for coagulation processing, a glass fiber powder (PFA001, manufactured by Nitto Boseki Co., Ltd.) in an amount of 25% based on the mass of PTFE, was added, followed by stirring at 2,000 rpm by means of a high speed stirrer having a diameter of 60 mm and having 6 turbine vanes, whereby a case where the time required for coagulation was not more than 1,000 seconds was judged to be "good" and a case where the time required for coagulation exceeded 1,000 seconds, was judged to be "no good".

(J) Storage stability: Into a 100 cc glass measuring cylinder, an aqueous PTFE dispersion for coagulation processing was put, and after putting a cover, left to stand for one month, whereupon the thickness of the supernatant resulting from the sedimentation of the PTFE microparticles was visually measured, whereby a case where the thickness was less than 10 mm was judged to be "good", and a case where the thickness was 10 mm or more was judged to be "no good".

(K) Specific surface area of synthetic adsorbent: Calculated by means of a BET adsorption method.

(L) Average particle size of synthetic adsorbent: After classification by means of sieves having different apertures, from the obtained integrated curve of mass, a particle size corresponding to 50 mass % was obtained and taken as the average particle size.

Example 1

To 50 kg of an aqueous PTFE polymerization emulsion containing 25.0 mass % of PTFE microparticles having a number average molecular weight of 1,250,000 and an average particle size of 0.26 μm and 0.40%, based on the mass of the PTFE microparticles, of $CF_3CF_2OCF_2CF_2OCF_2COONH_4$ (EEA) as a fluorinated anionic surfactant, a nonionic surfactant (a) (see Table 3) preliminarily diluted with deionized water was dissolved in a proportion of 3.0 mass % based on the mass of the PTFE microparticles, for stabilization to obtain a low concentration aqueous PTFE dispersion wherein the concentration of the PTFE microparticles was 24.1 mass %.

A weakly basic ion exchange resin (trade name "Diaion (registered trademark) WA-30", manufactured by Mitsubishi Chemical Corporation, average particle size: 0.5 mm) was packed in an ion exchange resin column (volume: 0.39 L) having a diameter of 2.5 cm and a length of 80 cm, and by means of a tube type pump, the low concentration aqueous PTFE dispersion was passed from the bottom of the column upwardly over a period of about 26 hours, and then, ammonium laurate (lauric acid neutralized with ammonia) was added in an amount of 0.05 mass % based on the mass of the PTFE microparticles to obtain a purified aqueous PTFE dispersion wherein the concentration of the PTFE microparticles was 24.0 mass %, and the concentration of the nonionic surfactant was 3.0 mass % based on the mass of the PTFE microparticles. Here, the concentration of EEA was 0.001 mass % based on the mass of the PTFE microparticles, as a result of the analysis by GC-MS.

Then, using 30 kg of this purified aqueous PTFE dispersion, concentration was carried out by an electrophoresis, and the upper supernatant was removed, and aqueous ammonia (containing 28 mass % of ammonia) in an amount of 0.1 mass % based on the mass of the PTFE microparticles was added as an antiseptic to obtain a high concentration aqueous PTFE dispersion wherein the concentration of the PTFE microparticles was 66.1 mass %, the concentration of the nonionic surfactant was 2.25 mass % based on the mass of the PTFE microparticles, and the concentration of EEA was 0.001 mass % based on the mass of the PTFE microparticles.

To 1 kg of this high concentration aqueous PTFE dispersion, a synthetic adsorbent (A) (see Table 4, specific surface area: 511 m²/g, pore volume: 1.3 ml/g, water: 50%) in an amount of 2 mass % based on the mass of the PTFE microparticles, was added. And, by means of stirring vanes having a diameter of 50 mm and having three twisted vanes, stirring was carried out at 120 rpm for 12 hours. Thereafter, the mixture was passed through a nylon filter of 100 mesh to obtain an aqueous PTFE dispersion for coagulation processing, wherein the concentration of the PTFE microparticles was 66.0 mass %, and the concentration of the nonionic surfactant was 1.71 mass % based on the mass of the PTFE microparticles.

To 500 g of this aqueous PTFE dispersion for coagulation processing, a glass fiber powder (trade name "PFA001", manufactured by Nitto Boseki Co., Ltd.) in an amount of 25 mass % based on the mass of the PTFE microparticles was added, followed by stirring at 2,000 rpm by means of a high speed stirrer to carry out a coagulation test. As a result, the time required for the coagulation was 402 seconds, and a coagulated product having the glass fiber powder uniformly mixed, was obtained.

Further, this aqueous PTFE dispersion for coagulation processing was left to stand still for one month, whereupon the supernatant was 1 mm, and thus, the storage stability was good.

Example 2

To 1 kg of the high concentration aqueous PTFE dispersion obtained in Example 1, a synthetic adsorbent (B) (see Table 4, VPOC1163, manufactured by Lanxess, specific surface area: 1,200 m$^2$/g, pore volume: 0.5 ml/g, water: 40%) in an amount of 1.5 mass % based on the mass of the PTFE microparticles was added. Then, stirring was carried out at 100 rpm for 24 hours, and the mixture was passed through a nylon filter of 100 mesh to obtain an aqueous PTFE dispersion for coagulation processing wherein the concentration of the PTFE microparticles was 66.1%, and the concentration of the nonionic surfactant was reduced to 1.85 mass % based on the mass of the PTFE microparticles.

Using 500 g of this aqueous PTFE dispersion for coagulation processing, a coagulation test was carried out in the same manner as in Example 1. As a result, the time required for the coagulation was 605 seconds, and a coagulated product having the glass fiber powder uniformly mixed was obtained.

Further, this aqueous PTFE dispersion for coagulation processing was left to stand still for one month, whereupon the supernatant was 1 mm, and thus, the storage stability was good.

Example 3

1 kg of the high concentration aqueous PTFE dispersion obtained in Example 1 was diluted with water to adjust the concentration of the PTFE microparticles to be 55.5%, and then, a synthetic adsorbent (C) (see Table 4, MN202 manufactured by Purolite, specific surface area: 700 m$^2$/g, pore volume: 1.05 ml/g, water: 55%) in an amount of 5 mass % based on the mass of the PTFE microparticles, was added. And, stirring was carried out at 100 rpm for 4 hours, and the mixture was passed through a nylon filter of 100 mesh to obtain an aqueous PTFE dispersion for coagulation processing wherein the concentration of the PTFE microparticles was 55.4%, and the concentration of the nonionic surfactant was reduced to 1.62% based on the mass of the PTFE microparticles.

Using 500 g of this aqueous PTFE dispersion for coagulation processing, a coagulation test was carried out in the same manner as in Example 1. As a result, the time required for the coagulation was 250 seconds, and a coagulated product having the glass fiber powder uniformly mixed, was obtained.

Further, this aqueous PTFE dispersion for coagulation processing was left to stand for one month, whereupon the supernatant was 4 mm, and thus, the storage stability was good.

Example 4

To 5 kg of the purified aqueous PTFE dispersion obtained in Example 1, a nonionic surfactant (b) (see Table 3) was added and dissolved in an amount of 10.0 mass % based on the mass of the PTFE microparticles, and aqueous ammonia (containing 28 mass % of ammonia) was added in an amount of 0.2 mass % based on the mass of the PTFE microparticles, followed by heating to 80° C. and being left overnight for phase separation, whereupon the upper supernatant was removed. By this operation, a high concentration aqueous PTFE dispersion was obtained wherein the concentration of the PTFE microparticles was 64.5 mass %, the concentration of the nonionic surfactant was 3.26 mass % based on the mass of the PTFE microparticles, and the concentration of EEA was 0.038 mass % based on the mass of the PTFE microparticles.

To 1 kg of this high concentration aqueous PTFE dispersion, a synthetic adsorbent (A) (see Table 4) in an amount of 7 mass % based on the mass of the PTFE microparticles was added. And, stirring was carried out at 100 rpm for 24 hours, and then, the mixture was passed through a nylon filter of 100 mesh to obtain an aqueous PTFE dispersion for coagulation processing, wherein the concentration of the PTFE microparticles was 64.5%, and the concentration of the nonionic surfactant was 1.83 mass % based on the mass of the PTFE microparticles.

Using 500 g of this aqueous PTFE dispersion for coagulation processing, a coagulation test was carried out in the same manner as in Example 1. As a result, the time required for the coagulation was 394 seconds, and a coagulated product having the glass fiber powder uniformly mixed was obtained.

Further, this aqueous PTFE dispersion for coagulation processing was left to stand for one month, whereupon the supernatant was 1 mm, and thus, the storage stability was good.

Example 5

To 5 kg of the purified aqueous PTFE dispersion obtained in Example 1, a nonionic surfactant (c) (see Table 3) was added and dissolved in an amount of 12 mass % based on the mass of the PTFE microparticles, and aqueous ammonia was added in an amount of 0.2 mass % based on the mass of the PTFE microparticles, followed by heating at 80° C. and being left for overnight for phase separation, whereupon the upper supernatant was removed. By this operation, a high concentration aqueous PTFE dispersion was obtained wherein the concentration of the PTFE microparticles was 64.0%, the concentration of the nonionic surfactant was 3.82 mass % based on the mass of the PTFE microparticles, and the concentration of EEA was 0.045 mass % based on the mass of the PTFE microparticles.

Using 1 kg of this high concentration aqueous PTFE dispersion, a synthetic adsorbent (A) (see Table 4) in an amount of 9 mass % based on the mass of the PTFE microparticles was added. And, stirring was carried out at 150 rpm for 20 hours, and then, the mixture was passed through a nylon filter of 100 mesh to obtain an aqueous PTFE dispersion for coagulation processing, wherein the concentration of the PTFE microparticles was 63.9 mass %, and the concentration of the nonionic surfactant was 1.73 mass % based on the mass of the PTFE microparticles.

Using 500 g of this aqueous PTFE dispersion for coagulation processing, a coagulation test was carried out in the same manner as in Example 1. As a result, the time required for the coagulation was 515 seconds, and a coagulated product having the glass fiber powder uniformly mixed, was obtained.

Further, this aqueous PTFE dispersion for coagulation processing was left to stand still for one month, whereupon the supernatant was 1 mm, and thus, the storage stability was good.

Example 6

Using 500 g of the high concentration aqueous PTFE dispersion obtained in Example 1 as it was, a coagulation test was attempted, but since the concentration of the nonionic surfactant was too high, it was not possible to coagulate the dispersion.

Example 7

Using 1 kg of the aqueous PTFE polymerization emulsion obtained in Example 1, a nonionic surfactant (C) preliminarily diluted with deionized water was dissolved in an amount of 1.8 mass % based on the mass of the PTFE microparticles to obtain a low concentration aqueous PTFE dispersion wherein the concentration of the PTFE microparticles was 24.6 mass %.

Using this low concentration aqueous PTFE dispersion, a coagulation test was carried out, whereby it was possible to coagulate the dispersion, but the concentration of the PTFE microparticles was too low, and the supernatant after one month was as large as 25 mm, and thus, the storage stability was poor. Further, in this low concentration aqueous PTFE dispersion, the fluorinated anionic surfactant was 0.40% based on the mass of the PTFE particles, such being undesirable from the viewpoint of retention in the environment, and in order to reduce it, it was attempted to supply the dispersion by a tube pump to pass it through the ion exchange resin column, but after 15 minutes, clogging occurred in the column, and it became impossible to continue the operation.

Example 8

To 500 g of the high concentration aqueous PTFE dispersion obtained in Example 1, a synthetic adsorbent (A) (see Table 4) in an amount of 20 mass % based on the mass of the PTFE microparticles (212 g per 1 L of the high concentration aqueous PTFE dispersion) was added, followed by stirring at 100 rpm, but since the amount of the synthetic adsorbent was too much, agglomeration (gelation) of the dispersion occurred 10 hours later.

Example 9

To 1 kg of the high concentration aqueous PTFE dispersion obtained in Example 1, an ion exchange resin (D) (see Table 4) in an amount of 2 mass % based on the PTFE microparticles was added, followed by stirring at 100 rpm for 24 hours. However, this ion exchange resin (D) had a small specific surface area and thus had a low adsorption of the nonionic surfactant, and the concentration of the nonionic surfactant remained to be 2.18% based on the mass of the PTFE microparticles.

Using the obtained aqueous PTFE dispersion for coagulation processing, a coagulation test was carried out, whereby since the concentration of the nonionic surfactant was too high, it was not possible to accomplish the coagulation.

Example 10

To 500 g of the high concentration aqueous PTFE dispersion obtained in Example 1, a granular active carbon (E) (see Table 4) in an amount of 2 mass % based on the PTFE microparticles were added, followed by stirring at 1,000 rpm, whereby the dispersion underwent color change to a gray color due to detachment of a carbonaceous fine powder attached to the active carbon. And, when stirring was continued, foreign substances were formed with the detached carbonaceous fine powder as nuclei, and 20 hours later, the entire dispersion underwent agglomeration (gelation).

Example 11

A synthetic adsorbent (C) (see Table 4) was packed in a column (volume: 0.39 L) having a diameter of 2.5 cm and a length of 80 cm, and by means of a tube type pump, it was attempted to pass the high concentration aqueous PTFE dispersion obtained in Example 1 therethrough to reduce the nonionic surfactant. However, about one minute later, clogging occurred in the column due to agglomerates, whereby it became impossible to pass the dispersion therethrough.

The above results are summarized in Tables 1 and 2.

TABLE 1

| | Items | Ex. 1 | Ex. 2 | Ex. 3 | Ex. 4 | Ex. 5 |
|---|---|---|---|---|---|---|
| Aqueous PTFE dispersion used | Concentration of PTFE microparticles (mass %) | 66.1 | 66.1 | 55.5 | 64.5 | 64 |
| | Type of nonionic surfactant | (a) | (a) | (a) | (a) + (b) | (a) + (c) |
| | Concentration of nonionic surfactant (mass %/PTFE) | 2.25 | 2.25 | 2.25 | 3.26 | 3.82 |
| | Concentration of fluorinated surfactant (mass %/PTFE) | 0.001 | 0.001 | 0.001 | 0.038 | 0.045 |
| Adsorption treatment | Type of adsorbent | (A) | (B) | (C) | (B) | (A) |
| | Concentration of adsorbent (mass %/PTFE) | 2 | 1.5 | 5 | 7 | 9 |
| | Stirring speed (rpm) | 120 | 100 | 100 | 100 | 150 |
| | Stirring time (hour) | 12 | 24 | 4 | 24 | 20 |
| Physical properties of obtained aqueous PTFE dispersion for coagulation processing | Concentration of PTFE microparticles (mass %) | 66 | 66.1 | 55.4 | 64.5 | 63.9 |
| | Concentration of nonionic surfactant (mass %/PTFE) | 1.71 | 1.85 | 1.62 | 1.83 | 1.73 |
| | Viscosity (mPa·s) | 45 | 49 | 10 | 52 | 50 |
| | pH | 9.5 | 9.4 | 9.3 | 9.2 | 9.3 |
| | Appearance | Good | Good | Good | Good | Good |
| | Coagulation time (sec) | 402 | 605 | 250 | 394 | 515 |
| | Thickness of supernatant after one month (mm) | 1 | 1 | 4 | 1 | 1 |
| | Storage stability | Good | Good | Good | Good | Good |

TABLE 2

| Items | | Ex. 6 | Ex. 7 | Ex. 8 | Ex. 9 | Ex. 10 |
|---|---|---|---|---|---|---|
| Aqueous PTFE dispersion used | Concentration of PTFE microparticles (mass %) | 66.1 | 24.6 | 66.1 | 66.1 | 66.1 |
| | Type of nonionic surfactant | (a) | (c) | (a) | (a) | (a) |
| | Concentration of nonionic surfactant (mass %/PTFE) | 2.25 | 1.8 | 2.25 | 2.25 | 2.25 |
| | Concentration of fluorinated surfactant (mass %/PTFE) | 0.001 | 0.4 | 0.001 | 0.001 | 0.001 |
| Adsorption treatment | Type of adsorbent | Nil | Nil | (A) | (D) | (E) |
| | Concentration of adsorbent (mass %/PTFE) | Nil | Nil | 20 | 2 | 2 |
| | Stirring speed (rpm) | Nil | Nil | 100 | 100 | 100 |
| | Stirring time (hour) | Nil | Nil | 10 (gelled) | 24 | 20 (gelled) |
| Physical properties of obtained aqueous PTFE dispersion for coagulation processing | Concentration of PTFE microparticles (mass %) | 66.1 | 24.6 | — | 66 | — |
| | Concentration of nonionic surfactant (mass %/PTFE) | 2.25 | 1.8 | — | 2.18 | — |
| | Viscosity (mPa · s) | 45 | 3 | — | 44 | — |
| | pH | 9.6 | 9.1 | — | 9.5 | — |
| | Appearance | Good | Good | — | Good | — |
| | Coagulation time (sec) | >1,000 not coagulated | 540 | — | >1,000 not coagulated | — |
| | Thickness of supernatant after one month (mm) | — | 25 | — | — | — |
| | Storage stability | — | No good | — | — | — |

TABLE 3

| Type of nonionic surfactant | Manufacturer and trade name | Chemical structure |
|---|---|---|
| (a) | Newcol 1308FA manufactured by Nippon Nyukazai Co., Ltd. | $C_{13}H_{27}O(C_2H_4O)_8C_3H_6OH$ |
| (b) | Tergitol 15-S-9 manufactured by The Dow Chemical Company | $C_{12-14}H_{25-29}O(C_2H_4O)_9H$ |
| (c) | Triton X-100 manufactured by The Dow Chemical Company | $C_8H_{17}C_6H_4O(C_2H_4O)_{10}H$ |

TABLE 4

| Type of adsorbent | Manufacturer and trade name | Component | Specific surface area ($m^2/g$) | Average particle size (μm) | Water (%) |
|---|---|---|---|---|---|
| Synthetic adsorbent (A) | Synthetic adsorbent HP20 manufactured by Mitsubishi Chemical Corporation | Porous styrene/divinyl-benzene | 511 | 550 | 50 |
| Synthetic adsorbent (B) | Synthetic adsorbent VPOC1163 manufactured by Lanxess | Porous styrene/divinyl-benzene | 1,200 | 770 | 40 |
| Synthetic adsorbent (C) | Synthetic adsorbent MN202 manufactured by Purolite | Porous styrene/divinyl-benzene | 700 | 750 | 55 |
| Ion exchange resin (D) | Strongly basic ion exchange resin MP600 manufactured by Lanxess | Styrene/divinyl-benzene copolymer containing ion exchange groups | 70 | 720 | — |
| Active carbon (E) | Active carbon "Shirasagi WH2C" manufactured by Japan EnviroChemicals, Ltd. | Active carbon | 600 | 1,080 | — |

INDUSTRIAL APPLICABILITY

The aqueous PTFE dispersion for coagulation processing of the present invention is useful as e.g. a lubricating component or an electrode material for batteries.

This application is a continuation of PCT Application No. PCT/JP2010/068086, filed on Oct. 14, 2010, which is based upon and claims the benefit of priority from Japanese Patent Application No. 2009-239354 filed on Oct. 16, 2009. The contents of those applications are incorporated herein by reference in its entirety.

What is claimed is:

1. A process for producing an aqueous polytetrafluoroethylene dispersion for coagulation processing, which comprises adding a synthetic adsorbent having a specific surface area of from 100 to 2,000 $m^2/g$, to an aqueous polytetrafluoroethylene dispersion containing from 45 to 70 mass % of polytetrafluoroethylene microparticles having an average particle size of from 0.10 to 0.50 μm and from 2.2 to 6 mass %, based on the mass of the polytetrafluoroethylene microparticles, of a nonionic surfactant, in a proportion of from 0.5 to 15 mass %, based on the mass of the polytetrafluoroethylene microparticles, followed by stirring or shaking and then by separation into a liquid phase and a solid phase, and recovering the liquid phase.

2. The process for producing an aqueous polytetrafluoroethylene dispersion for coagulation processing according to claim 1, wherein after adding the synthetic adsorbent to the aqueous polytetrafluoroethylene dispersion, the stirring or shaking is carried out for from 1 to 100 hours, and then the separation is carried out, to bring the concentration of the nonionic surfactant to be from 1.4 to 2.1 mass %, based on the mass of the polytetrafluoroethylene microparticles.

3. The process for producing an aqueous polytetrafluoroethylene dispersion for coagulation processing according to claim 1, wherein the separation is carried out by subjecting the aqueous polytetrafluoroethylene dispersion containing the synthetic adsorbent to filtration with a filter of from 50 to 500 mesh.

4. The process for producing an aqueous polytetrafluoroethylene dispersion for coagulation processing according to claim 1, wherein the nonionic surfactant is of formula (1), formula (2) or a combination thereof:

$$R^1\text{—O-A-H} \quad (1)$$

wherein,
$R^1$ is a $C_{8-18}$ alkyl group, and
A is a polyoxyalkylene chain having from 5 to 20 oxyethylene groups, from 0 to 2 oxypropylene groups and from 0 to 2 oxybutylene groups, $$R^2\text{—}C_6H_4\text{—O—B—H} \quad (2)$$

wherein,
$R^2$ is a $C_{4-12}$ alkyl group, and
B is a polyoxyethylene chain having from 5 to 20 oxyethylene groups.

5. The process for producing an aqueous polytetrafluoroethylene dispersion for coagulation processing according to claim 1, wherein the nonionic surfactant is added to an aqueous polymerization emulsion of a polytetrafluoroethylene obtained by subjecting tetrafluoroethylene to emulsion polymerization in the presence of water, a polymerization initiator and a fluorinated anionic surfactant, followed by contact with an anion exchange resin to reduce the fluorinated anionic surfactant in the aqueous polymerization emulsion, and then, concentration treatment is carried out to obtain the aqueous polytetrafluoroethylene dispersion.

6. The process for producing an aqueous polytetrafluoroethylene dispersion for coagulation processing according to claim 5, wherein the aqueous polymerization emulsion of a polytetrafluoroethylene is contacted with the anion exchange resin to bring the content of the fluorinated anionic surfactant in the aqueous polymerization emulsion of a polytetrafluoroethylene to be from 0.00001 to 1 mass %, based on the mass of the polytetrafluoroethylene microparticles.

7. The process for producing an aqueous polytetrafluoroethylene dispersion for coagulation processing according to claim 5, wherein the fluorinated anionic surfactant is $C_2F_5OC_2F_4OCF_2COONH_4$.

* * * * *